United States Patent
Steffen

(10) Patent No.: US 11,626,745 B2
(45) Date of Patent: Apr. 11, 2023

(54) POWER SUPPLY UNIT HAVING A HOUSING AND A RECHARGEABLE ELECTRICAL STORE

(71) Applicant: Wacker Neuson Produktion GmbH & Co. KG, Reichertshofen (DE)

(72) Inventor: Michael Steffen, Munich (DE)

(73) Assignee: Wacker Neuson Produktion GmbH & Co. KG, Reichertshofen (DE)

( * ) Notice: Subject to any disclaimer, the term of this patent is extended or adjusted under 35 U.S.C. 154(b) by 0 days.

(21) Appl. No.: 16/902,702

(22) Filed: Jun. 16, 2020

(65) Prior Publication Data

US 2020/0395773 A1     Dec. 17, 2020

(30) Foreign Application Priority Data

Jun. 17, 2019  (DE) ...................... 2020019103388.6

(51) Int. Cl.
*H02J 7/00* (2006.01)
*H02J 5/00* (2016.01)

(52) U.S. Cl.
CPC .............. *H02J 7/0045* (2013.01); *H02J 5/00* (2013.01)

(58) Field of Classification Search
CPC .............. H02J 7/0045; H02J 5/00; H02J 9/00
USPC ....................................................... 320/107
See application file for complete search history.

(56) References Cited

U.S. PATENT DOCUMENTS

| | | | | |
|---|---|---|---|---|
| 6,510,328 | B1 * | 1/2003 | Myllymaki | H04B 1/3833 |
| | | | | 455/554.1 |
| 8,970,164 | B2 * | 3/2015 | Scheucher | H02J 7/0063 |
| | | | | 320/136 |
| 9,067,477 | B2 * | 6/2015 | Onimaru | B60L 1/12 |
| 9,548,628 | B2 * | 1/2017 | Ben Aharon | H02J 7/342 |
| 9,899,835 | B2 * | 2/2018 | Mino | H02J 1/102 |
| 10,910,874 | B2 * | 2/2021 | Ellis | H02J 9/04 |
| 2007/0013340 | A1 * | 1/2007 | Mattichak | H02J 7/00306 |
| | | | | 320/101 |
| 2007/0184339 | A1 * | 8/2007 | Scheucher | B60L 58/12 |
| | | | | 211/13.1 |

(Continued)

FOREIGN PATENT DOCUMENTS

| | | | | |
|---|---|---|---|---|
| CN | 102781756 B | * | 1/2016 | ............. B23P 11/00 |
| DE | 8223987 | | 11/1982 | |
| JP | 2014073802 A | * | 4/2014 | ............. Y02T 10/72 |

*Primary Examiner* — M Baye Diao
(74) *Attorney, Agent, or Firm* — Boyle Fredrickson S.C.

(57) ABSTRACT

A transportable power supply unit has at least one rechargeable electrical store for storing electric power and having a housing. At least one inverter converts a DC voltage of the rechargeable electrical store into a first AC voltage, such as a first grid voltage and/or first three-phase current, and/or into a second AC voltage. At least one connection unit, such as at least one socket and a plug, is provided for the first AC voltage and/or for the grid voltage. The connection unit is in the form of an AC voltage output of the inverter for the first AC voltage. At least one detachably connectable connecting unit is provided for the rechargeable electrical store. The connecting unit comprises at least one electrical contact apparatus for making detachably connectable contact with the rechargeable electrical store and at least one detachably connectable retaining apparatus for detachably connectably retaining the rechargeable electrical store in the housing.

15 Claims, 2 Drawing Sheets

(56) References Cited

U.S. PATENT DOCUMENTS

2008/0169139 A1* 7/2008 Kramer .................. B60L 3/003
                                                903/952
2018/0323641 A1* 11/2018 Lee ........................... H02J 7/04
2022/0186453 A1* 6/2022 Steffen .................... E01C 19/26

* cited by examiner

POWER SUPPLY UNIT HAVING A HOUSING AND A RECHARGEABLE ELECTRICAL STORE

BACKGROUND OF THE INVENTION

1. Field of the Invention

The invention relates to a transportable power supply unit having at least one rechargeable electrical store for storing electric power and having a housing that stores a converter and that that has a connection unit having an output for at least one of first and second voltages.

2. Discussion of the Related Art

Transportable power generators such as emergency generators etc. are already in use. These are usually intended to generate electric power that is used, for example, when the electricity grid is not available or in the event of failure of a primary electricity supplier, e.g. the public grid. These transportable power generators are, for the most part, equipped with a diesel or petrol engine which drives an electrical generator. The generator then generates the AC voltage such as e.g. a grid voltage at 230 V or else what is known as a "heavy current" at 380 V. Appropriate sockets or outlets are present on the housing for the purpose of connection to one or more loads.

The document DE 82 23 987 U from 1982 relates to a transportable emergency generator that has electrical storage batteries that are charged by solar cells or PV modules.

Electrical equipment, among other things, is now also becoming increasingly established in the building and construction trade or the like. As such, e.g. electrical tampers, rollers, chainsaws, scythes, etc. are already in use that are supplied with power or operated by electrical storage batteries. A solar-operated power unit is not suitable for continuous use or multiple hours of operation for large equipment or larger loads of this kind e.g. on a modern building site.

SUMMARY OF THE INVENTION

By contrast, it is an object of the invention to propose a transportable power supply unit that remedies at least some of the disadvantages of the prior art, in particular one is suitable for continuous use of a load.

This object is achieved by providing a transportable power supply having a at least one (toollessly) detachably connectable connecting unit for the rechargeable electrical store. The connecting unit comprises at least one electrical contact apparatus for making (toollessly) detachably connectable contact with the rechargeable electrical store and at least one (toollessly) detachably connectable retaining apparatus for (toollessly) detachably connectably retaining the rechargeable electrical store in the housing.

A toollessly detachably connectable connecting unit of this kind can be used to replace the rechargeable electrical store when required without great effort and without tools. This opens up completely new kinds of opportunities for the operation of the transportable power supply unit. As such, it is advantageously possible for a discharged or almost discharged, first, electrical store to be replaced, wherein a different or second, charged, electrical store are installed by means of the connecting unit according to the invention, preferably toollessly, or are connected in or connected to the power supply unit.

As such, electric power at advantageous AC voltage is available for a load again immediately and very quickly, i.e. without longer charging times. This is of decisive advantage, especially for comparatively long use with larger loads such as e.g. vibrators, tampers, rollers, etc. on a building site or the like. By way of example, multiple, e.g. approximately 5 or 10, charged, replaceable, electrical stores can be used to ensure an almost unlimited supply of power for construction equipment or the like. Especially in the building and construction trade, this opens up hitherto infeasible opportunities for application for powerful construction equipment/machines.

Advantageously, an electrical charging apparatus for charging the rechargeable electrical store comprises at least one electrical and/or electronic charging controller for controlling a charging process of the rechargeable electrical store. The charging controller is in the form of an AC/DC converter for converting the first AC voltage into a DC voltage of the rechargeable electrical store. The connection unit is in the form of an AC voltage input of the charging controller. This allows the rechargeable electrical store to be not only quickly replaced but also, advantageously, charged when required or when there is sufficient time, e.g. overnight or over the lunch break, etc. Accordingly, it is possible to dispense with storing and using multiple rechargeable electrical stores. This saves costs/investment costs, among other things.

The connection unit may have at least one grid connection for the first AC voltage, which is in the form of a grid voltage e.g. of approximately 115 V at 60 Hz and/or single-phase grid voltage of approximately 230 V at 50 Hz and/or what is known as "three-phase current" of approximately 400 V at 50 Hz, and also at least one low-voltage connection, e.g. 24 V or approximately 35 to 50 V such as in particular approximately 42 V/48 V at 200 Hz, for the second AC voltage. As such, multiple or different loads, in particular from working equipment or the like customary in the building and construction trade, can be simultaneously or alternately operated or supplied with electric power/voltage advantageously using the transportable power supply unit according to the invention.

In an advantageous embodiment of the invention, there is provision for at least one cooling unit for cooling the rechargeable electrical store, wherein preferably the cooling unit is simultaneously in the form of a charging controller cooling unit for cooling the charging controller and/or moreover in the form of an inverter cooling unit for cooling the inverter. This allows an increase in efficiency and an increase in the life of the store and/or of the charging controller and/or of the inverter to be achieved. Moreover, dual/multiple use of the cooling can be put into effect to result in particularly advantageous manufacture and operation of the power supply unit according to the invention in terms of economics and design.

Advantageously, the housing may comprise at least one retaining frame for retaining/positioning the rechargeable electrical store, in particular in/inside the housing. This allows secure and permanent integration of the store during operation.

The electrical contact apparatus may comprise at least one (toolless) plug apparatus for (toollessly) plugging in and connecting the rechargeable electrical store. As such, plugging-in/contact can be achieved e.g. simultaneously with the connecting of the rechargeable electrical store according to the invention. This improves the design complexity and the manageable.

In a particular development of the invention, the plug apparatus comprises at least one store connecting cable having a first connecting plug or having a first connecting socket for a first store socket or for a first store plug of the rechargeable electrical store. This allows the plugging-in/connecting of the rechargeable electrical store to be put into effect advantageously. As such, e.g. the rechargeable electrical store can be connected to the cable manually, so that the rechargeable electrical store can be placed in the housing without great effort.

BRIEF DESCRIPTION OF THE DRAWINGS

An exemplary embodiment of the invention is depicted in the drawing and is explained in more detail below on the basis of the figures.

Specifically.

DETAILED DESCRIPTION

Figure 1:
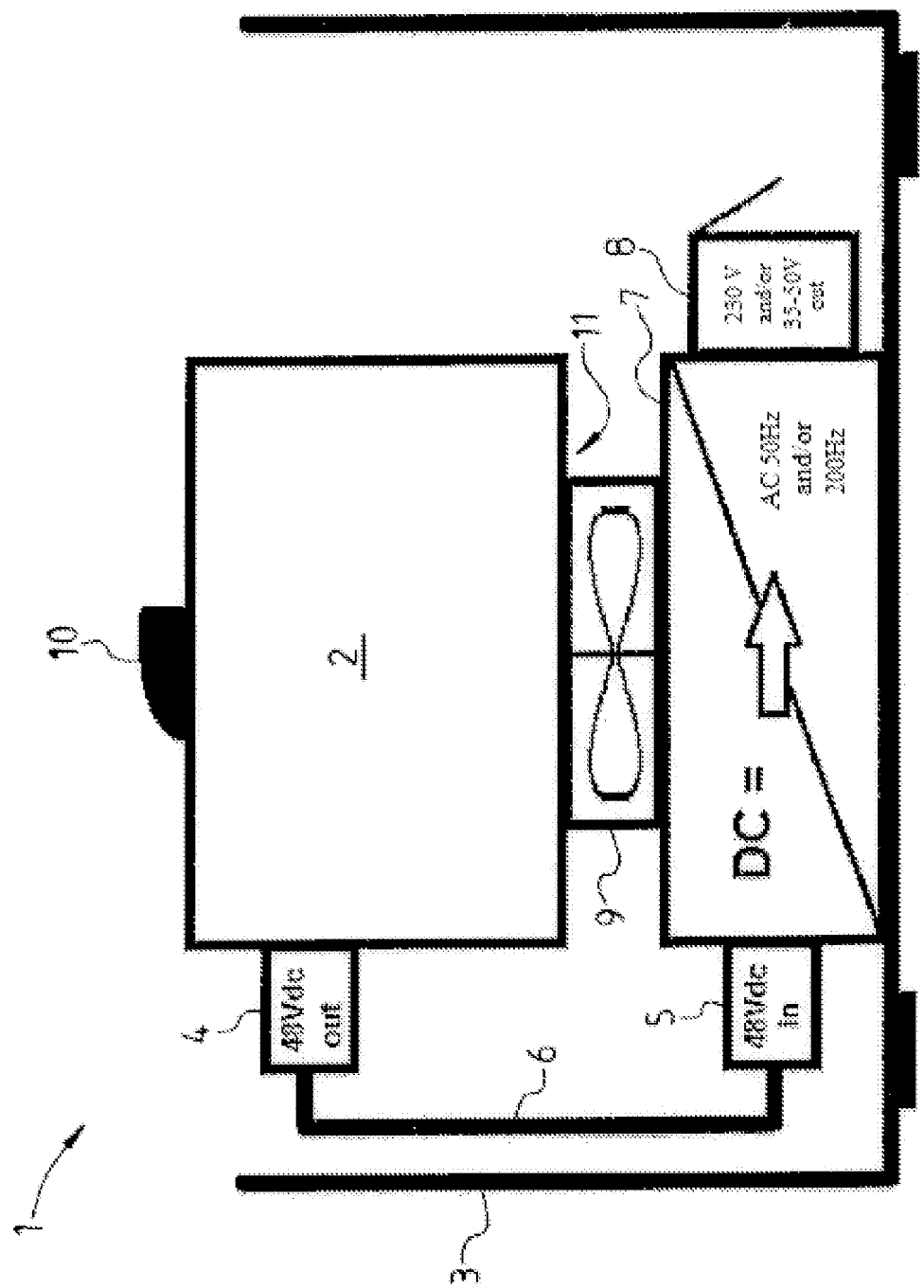
FIG. 1 shows a schematic design of a transportable power supply unit according to the invention in the generator mode.

FIG. 1 schematically depicts a transportable power supply unit 1, wherein a storage battery 2 or rechargeable electrical store 2 is arranged in a supporting structure 3 or supporting frame 3. In this instance, the store 2 or storage battery 2 is retained/fixed in toollessly, detachably connectable fashion by means of a mount 11 or bracket 11.

The storage battery 2 has e.g. a voltage of 48 Vdc, which is connected to an inverter 7 by means of a plug 4 via a flexible electrical cable 6 and a plug 5. In the generator mode shown in FIG. 1, the inverter 7 advantageously generates a grid voltage or AC voltage, e.g. 230 V at 50 Hz, which is applied to a plug socket 8 or a connection 8. An appropriate electrical load can be connected to or plugged into the plug socket 8 or the connection 8.

A fan 9 cools the storage battery 2 and also the inverter 7.

The storage battery 2 has a grip 10, so that it can be taken from the supporting frame 3 by hand and replaced with a different, second storage battery 2. The flexible, relatively long cable 6 and the plug(s) 4, 5 can be used to remove or install the storage battery 2 toollessly, detachably without great effort.

Figure 2:
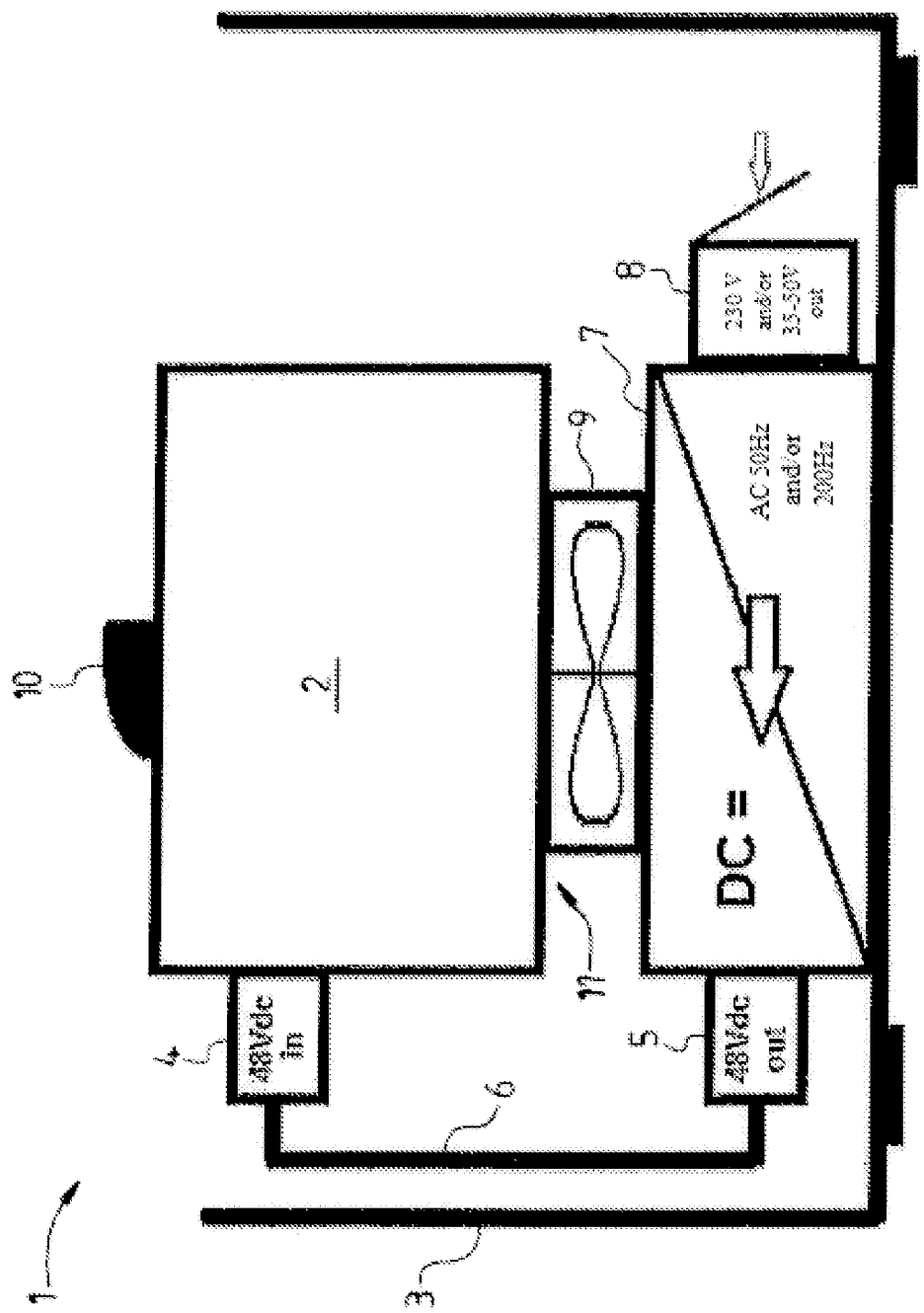
FIG. 2 shows a schematic design of a transportable power supply unit as shown in FIG. 1 in the charging mode.

In a charging mode of the storage battery 2 shown in FIG. 2, the inverter 7 is in the form of a charger 7, which means that an input voltage or AC voltage, e.g. 230 V at 50 Hz, can be used to generate a charging voltage of e.g. 48 Vdc, so that the storage battery 2 can be charged advantageously.

I claim:

1. A transportable power supply unit comprising:
at least one rechargeable battery for storing electric power;
a housing that supports the rechargeable battery, the housing including a supporting structure surrounding the rechargeable battery in order to dispose the rechargeable battery entirely within the housing,
at least one inverter, supported on the housing, for converting a DC voltage of the rechargeable battery into at least one of first and second AC voltages,
a first electrical connection unit, supported on the housing, for supplying the first AC voltage and/or the second AC voltage to or from the inverter, and
at least one detachably connectable connecting unit for the rechargeable battery, wherein the connecting unit comprises 1) a second electrical connection unit on the battery, and a third electrical connection unit in the housing for making detachably connectable electrical contact with the second electrical connection unit, the third electrical connection unit being provided on a cable in electrical contact with the inverter, and 2) at least one detachably connectable bracket for detachably connectably retaining the rechargeable battery inside the housing.

2. The power supply unit as claimed in claim 1, further comprising an electrical charging apparatus for charging the rechargeable battery, wherein the charging apparatus comprises at least one electrical and/or electronic charging controller for controlling a charging process of the rechargeable battery, wherein the charging controller comprises an AC/DC converter for converting the first AC voltage into a DC voltage of the rechargeable battery, and wherein the first connection unit comprises an AC voltage input of the charging controller.

3. The power supply unit as claimed in claim 1, wherein the first AC voltage is a grid voltage and the second voltage is lower than the grid voltage, and wherein the first connection unit has at least one grid connection for the first AC voltage, and at least one low-voltage connection for the second AC voltage.

4. The power supply unit as claimed in claim 1, further comprising at least one cooling unit for cooling the rechargeable battery.

5. The power supply unit as claimed in claim 4, wherein the cooling unit further comprises a charging controller cooling unit for cooling the charging controller.

6. The power supply unit as claimed in claim 4, wherein the cooling unit further comprises an inverter cooling unit for cooling the inverter.

7. The power supply unit as claimed in claim 1, wherein the housing comprises at least one retaining frame for retaining the rechargeable battery.

8. The power supply unit as claimed in claim 1, wherein the first AC voltage comprises a first grid voltage and/or a first three-phase current.

9. The power supply unit as claimed in claim 1, wherein each of the second and third electrical connection units comprises at least one of a socket and a plug.

10. The power supply unit as claimed in claim 1, wherein the rechargeable electrical store includes a grip on an upper surface thereof, the grip configured to allow a user to remove the rechargeable electrical store from the housing.

11. A transportable power supply unit comprising:
at least one rechargeable battery configured to store electric power;
a housing that supports the rechargeable battery, the housing including a supporting structure that completely surrounds the rechargeable battery so that the battery is located entirely within the housing;
at least one inverter, located in the housing, for converting a DC voltage of the battery into a first AC voltage and a second AC voltage, the second AC voltage being lower than the first AC voltage;
a first electrical connection unit, supported on the housing, for supplying the first AC voltage and the second AC voltage to or from the inverter, and
at least one detachably connectable connecting unit for the battery, wherein the connecting unit comprises 1) a second electrical connection unit on the battery, and a third electrical connection unit in the housing for making detachably connectable electrical contact with the second electrical connection unit, the third electrical connection unit being provided on a cable in electrical contact with the inverter, 2) at least one bracket for detachably connectably retaining the battery inside the housing in a manner that permits removal of the battery from the housing while the inverter remains in the housing.

12. The transportable power supply unit as claimed in claim 11, wherein each of the second and third electrical connection units comprises at least one of a plug and a socket.

13. The transportable power supply unit as claimed in claim 11, further comprising a supporting frame in the housing that is configured to support the battery in the housing.

14. The transportable power supply as claimed in claim 11, further comprising a grip on the upper surface of the battery, the grip being configured to facilitate removal of the battery from the housing and insertion of the battery into the housing.

15. The transportable power supply as claimed in claim 11, wherein the first AC voltage comprises one of a grid voltage and a three-phase current.

* * * * *